Jan. 18, 1949. W. C. WALTERS 2,459,398
COMPRESSED AIR TREATMENT DEVICE
Filed July 12, 1946

INVENTOR
WYETH C. WALTERS
BY
ATTORNEYS

Patented Jan. 18, 1949

2,459,398

UNITED STATES PATENT OFFICE 2,459,398

COMPRESSED AIR TREATMENT DEVICE

Wyeth C. Walters, Glendale, Calif., assignor to CCA Products Engineering Company, Glendale, Calif., a copartnership Application July 12, 1946, Serial No. 683,258

5 Claims. (Cl. 184—55)

This invention relates to compressed air treating apparatus, and more particularly to the filtering of, and the injection of finely divided lubricant particles into, compressed air flowing intermittently through a line, especially where such compressed air is to be used as a power source in the driving of power tools and equipment.

It is common practice at present in many plants, and also by the use of portable power plants out of doors, to use compressed air for driving tools, such as drills, chipping and demolition hammers, screw drivers, riveters, and numerous other rotary and reciprocating types of tools. An essential of most of these tools is either a reciprocating piston or a turbine type rotor which travel at high speed and under varying loads in contact with relatively moving surfaces which require adequate lubrication in order to avoid excess wear. These relatively movable surfaces are subjected to the action of the compressed air flowing through the tool motor during its power operation. Any impurities in the airline, therefore, such as scale or particles of grit, are apt to damage the tool motor, or, in any event, to shorten its usable life between maintainance periods.

Various arrangements have been made in attempts to filter such impurities from compressed air flowing through an airline, and attempts also have been made to inject finely divided particles of lubricant into the air stream used for the operation of such tools as those described above. However, most of the lubricating devices are difficult to adjust properly, particularly when the tools are operated with varying degrees of frequency. Also, no device is known where a complete treatment of filtering and controlled injection of lubricant into the air stream is provided.

An object of the present invention is to make an improved lubricant supplier and filter for compressed air power lines.

Another object is to make a lubricant injector for compressed air power lines for providing a short, but relatively high pressure lubricant injecting actuation upon a sudden drop of pressure in the air line to which the device is connected.

Another object is to provide controlled filtering and automatic lubricant injection treatment of air flowing through a compressed air line.

Another object is to provide controlled lubricant injection into a compressed air line by trapping beyond a supply of lubricant a quantity of compressed air during a high compression period of air in a line associated therewith.

Another object is to control injection of lubricant into a compressed air line having alternative periods of high and low pressure therein, by a valve actuated by compressed air trapped during a high compression period of the air in said line.

These and other objects of the invention will be more fully set forth in the following description and the accompanying drawings, comprising one sheet. In the drawings.

Figure 1:
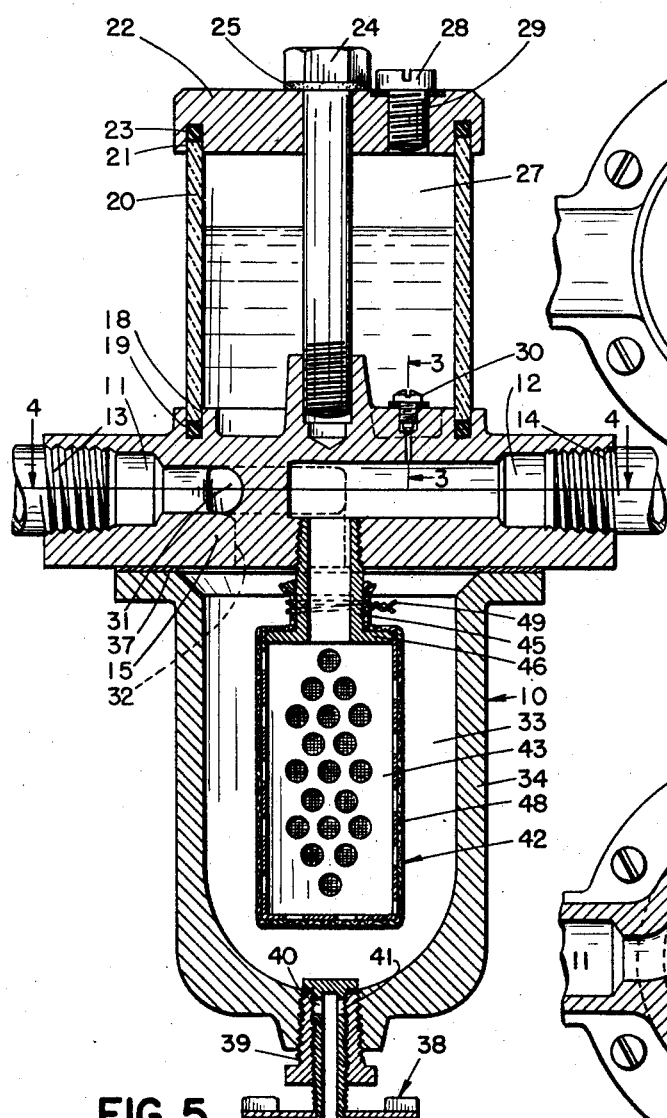
Fig. 1 is a vertical longitudinal sectional view through a combined air filter and lubricator embodying the present invention.
Figure 5:
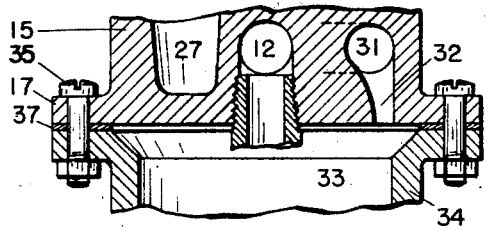
Fig. 5 is a fragmentary sectional view taken on the line 5—5 of Fig. 4.
Figure 2:
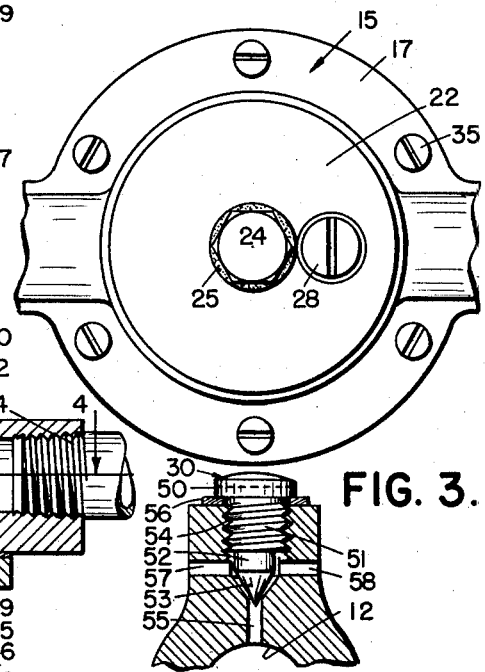
Fig. 2 is a plan view of the device illustrated in Fig. 1, portions of inlet and outlet pipe connections being broken away.

Referring to the drawings in detail, a filter-lubricator generally designated by the numeral 10 has an inlet connection 11 and an outlet connection 12 adapted to be connected into a compressed air line comprising an inlet pipe 13 which is connected from a compressor (not illustrated) into the inlet side of the device, and an outlet pipe 14 which is connected from the outlet side of the device 10 to a compressed air driven device such, for example, as a power driven tool (not shown).

The inlet and outlet connections 11 and 12 are formed in upwardly projecting bosses on an otherwise flat annular body portion 15. An annular flange 17 is provided on the upper side of the body portion 15 with an annular groove 18 in the upper face thereof. In this groove is seated a sealing gasket 19, such as a rubber O-ring. On the gasket is mounted the lower edge of an oil supply cylinder 20. The cylinder 20 preferably is of heavy transparent plastic material having sufficient strength to withstand the pressures for which the particular device is designed, for example, a working pressure of 125 pounds per square inch. The upper edge of the cylindrical member 20 is seated in a similar annular groove 21 in the lower side of a top cover member 22. The upper edge of the cylinder 20 is sealed similarly to the lower edge, as by means of a sealing ring 23.

The cover 22 is secured to the body member 15, as by means of a central bolt 24 which is provided with a gasket 25 gripped between the head of the bolt and the top of the cover 22 to seal against the escape of oil or compressed air from the interior of an oil supply chamber 27 thus formed. An oil filler screw 28 is threaded into a threaded oil filler opening 29 in the cover member. The opening 29 is positioned directly above an oil feed control screw 30, mounted in the body portion 15 and to be described later herein.

Figure 4:
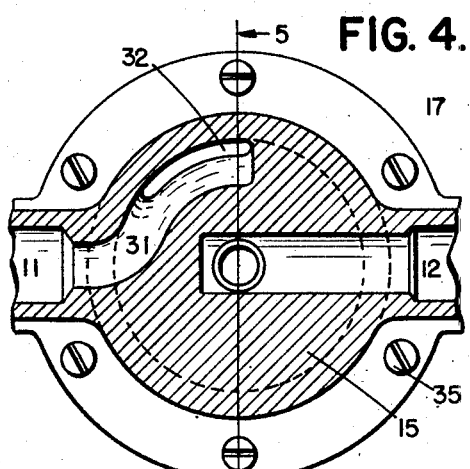
Fig. 4 is a sectional view taken on the line 4—4 of Fig. 1.

From the inlet connection 11 a passage 31 is curved, as illustrated in Fig. 4, around the center of the body portion 15, and opens downwardly through an elongated opening 32 into the space beneath the body portion 15. This downward opening 32 preferably is considerably larger than the smallest portion of the inlet opening, so as to reduce the velocity of the air as it is discharged into the area beneath the body portion. This means of discharging the air from the inlet into the area beneath the body portion directs it into this area beneath the body portion substantially tangentially of a chamber 33 in a cup-shaped receptacle 34 which is secured, as by means of screws 35, to the undersurface of the body portion 15. The undersurface of the body portion 15 is substantially flat, and the upper edge of the cup-shaped receptacle 34 is sealed by means of a circular gasket 37 interposed between the flanged upper end of the receptacle 34 and the lower face of the body portion.

This method of introducing the air into the chamber 33 causes a cyclonic turbulence which tends to throw any larger dirt particles carried thereby outwardly toward the outer wall of the chamber where they have a tendency to settle down to the lower end of the chamber.

A tubular blow-off valve member 38 is threadedly mounted in a plug 39 which in turn is threadedly mounted in a tapered threaded opening in the lower end of the receptacle 34. This blow-off valve is shown in closed position in Fig. 1. By screwing the valve member 38 upwardly, a pair of openings 40 and 41 in the side wall of the valve member 38 will be raised into exposed position in the chamber 33. Compressed air thus will be released outwardly through the tubular valve member, thereby tending to blow any particles of dirt or scale which may have collected in the device, or which may be clinging loosely to any exposed area within the chamber, outwardly through the tubular valve member.

A filter member 42 comprises a perforated cylindrical member 43 and perforated lower end portion thereof secured to a threaded tubular plug 45 having a flanged lower end portion 46. A filter member 48, which preferably is a felted wool baglike member, is secured in position over the perforated cylindrical wall 43 and lower end portion thereof, and is secured to the plug 45, as by winding a securing wire 49 around the upper end of the filter member 48 to secure it in position thereon.

The central opening of the tubular plug 45 opens into the air outlet 12 which may be either cored or drilled in an upwardly embossed portion of the body 15.

Figure 3:
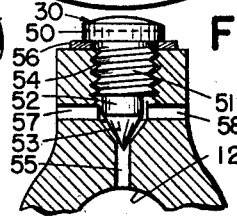
Fig. 3 is an enlarged fragmentary sectional view taken on line 3—3 of Fig. 1.

Referring now to the oil feed screw 30 illustrated in Figs. 1 and 3, this screw comprises a slotted head portion 50, a coarsely threaded upper body portion 51, a cylindrical lower portion 52 of reduced diameter, and a needle valve lower end portion 53. This oil feed screw is threaded into a hole 54 in the body portion 15 directly above the center of the outlet passage 12 in the body portion.

The hole in the body portion comprises a threaded upper portion adapted threadedly to receive the threaded portion of the screw 30 loosely therein. The lower end portion of the hole 54 is tapered inwardly and opens into a small vertical orifice 55 which in turn opens into the air outlet passage 12. A resilient washer 56 is provided beneath the head of the oil feed screw 30, and the screw, due to the looseness of its mounting in the screw threads in the hole 54 in which it is mounted, is free for limited up and down movement in the hole. A pair of lateral oil passages 57 and 58 are drilled from the oil supply chamber 27 into the lower portion of the screw receiving hole 54.

Since the oil feed screw 30 is located directly beneath the oil filler opening 29 in the cover 22, it may be reached by a screw driver (not shown) for adjustment as required. The length of the screw and the thickness of the washer 56 are such that the head of the screw engages the washer somewhat before the needle valve shaped lower end of the screw seats on the seat provided between the orifice 55 and the enlarged upper portion of the hole 54 in which the screw is mounted.

In using the device, it is mounted in an airline as shown. The tubular air clean-out control member 38 is screwed downwardly into closed position, as illustrated in Fig. 1. The oil filler screw 28 is removed and a quantity of oil, preferably slightly less than the amount required to completely fill the oil supply chamber 27, is poured into the oil chamber. The oil filler screw 28 then is replaced and is screwed down to seal the oil filler opening.

When the compressed air is admitted through the inlet pipe 13, it flows through the inlet connection 11, is discharged tangentially and with a swirling motion into the filtering chamber 33. Thence it flows through the felt filter member 48, through the perforations in the cylindrical wall 43 and end portion thereof, and upwardly through the central opening of the plug 45. From here it flows outwardly through the air outlet 12 and the outlet pipe 14 toward the power tool to which it may be connected.

Assuming that the power tool is in the closed or shut off position when air thus is admitted, the pressure will build up in all of the passages and chambers in which the compressed air is confined. Since this pressure is greater than the atmospheric pressure initially above the supply of oil in the oil supply chamber 27, air will be forced upwardly through the orifice 55, thereby forcing the oil feed screw 30 upwardly from its seat in its loosely threaded mounting. This compressed air then will flow upwardly around the screw threads 51 and through the lateral passages 57 and 58, and will bubble up through the oil, increasing the pressure on the air in the chamber 27 above the oil supply therein until this pressure is equalized with that at the mouth of the orifice 55.

When a power tool, connected to the outlet pipe 14, is actuated by admitting air therethrough, air will flow through the passages previously referred to and there will be a sudden and substantial drop in pressure in the outlet passage 12, the orifice 55 and the lateral passages 57 and 58. Since the air trapped above the oil in the chamber 27 transmits its pressure to the oil, this will produce a sudden relative increase in pressure on the oil in the oil supply chamber 27, which will eject a small amount of the oil through the passages 57 and 58 and thence outwardly through the orifice 55 into the rapidly traveling air stream in the outlet 12. This ejecting action is short lived, however, since almost immediately thereafter the unbalance in pressure between the oil in the chamber 27 and that in the oil outlet orifice 55 will force the screw 30 downwardly against the resilient action of the washer 56. This action is permitted by the looseness of the mounting of the screw 30 in the threads in the hole 54. This downward movement of the screw 30 brings the pointed lower end of the needle valve into closing relation with the seat at the upper end of the orifice 55.

This valve-like action of the screw 30 retains it in closed position as long as the tool remains operative. As soon as the air supply to the tool is shut off, however, the pressure in the outlet passage 12, together with the other passages through which the air flows, increases to the limit of the pressure control apparatus associated with the device. This increase in pressure, if it is above that of the air in the oil supply chamber 27, again forces air upwardly through the orifice 55, the lateral passages 57 and 58, upwardly into the upper end of the oil chamber, until the pressure is equalized with that in the remainder of the system. This operation is repeated upon each cycle of operation of the tool, so that a small amount of a mist-like spray of oil is injected into the air stream upon each operation of the tool or tools operated from the airline.

This arrangement provides a simple, positive and easily adjusted and maintained filtering and oiling device for installation in compressed air lines for the operation of compressed air driven power tools. It greatly increases the useful life of the tools and reduces maintenance thereon substantially. No flood of oil is possible providing the device is adjusted properly and the amount of oil delivered is proportioned to the frequency of operation of the tools connected to the airline in which the device is installed.

It will be apparent to those familiar with the art that the device is capable of modification without departing from the spirit of the invention. It is desired, therefore, not to limit the invention except as specifically defined in the following claims.

I claim:

1. A device for installation in a compressed air line, comprising a body portion having an inlet and an outlet, an oil supply chamber, a threaded passage communicating between the oil supply chamber and the outlet, a valve screw loosely threadedly mounted in said passage and having a portion thereof adapted to close said passage on a predetermined movement of said valve screw, said valve screw having the head thereof exposed to the oil in said oil supply chamber to move said valve from open to closed position on a predetermined unbalance of pressure between the oil in said oil chamber, and said outlet.

2. A device for installation in a compressed air line, comprising a body portion having an inlet and an outlet, an oil supply chamber, a passage communicating between the oil supply chamber and the outlet, a valve screw loosely threadedly mounted in said passage and having a portion thereof adapted to close said passage on a predetermined movement of said valve screw, resilient means mounted normally to hold said screw in position to open said passage, said valve screw having the head thereof exposed to the oil in said oil supply chamber to move said valve from open to closed position on a predetermined unbalance of pressure between the oil in said oil chamber and said outlet.

3. A device for installation in a compressed air line, comprising a body portion having an air inlet and an air outlet, an oil supply chamber, a passage communicating between the oil supply chamber and the air outlet, said passage having an enlarged threaded portion in open communication with the oil supply chamber and having an orifice of reduced diameter opening from the enlarged threaded portion to the air outlet, with a lateral passage from the enlarged threaded portion into a low point of the oil supply chamber, a valve screw loosely threadedly mounted in the enlarged threaded portion of the passage for limited axial play therein, said screw having an inner end portion of reduced diameter with a valve seat thereon adapted to close said orifice on a predetermined inward movement of said screw, said screw having a head portion exposed to oil in said oil supply chamber to move said screw from open to closed position in said orifice on a predetermined unbalance of pressure between the oil in said oil chamber and the pressure in said air outlet, such unbalance of pressure simultaneously acting to force a limited supply of oil through said orifice into said outlet.

4. A device for installation in a compressed air line, comprising a body portion having an air inlet and an air outlet, an oil supply chamber, a passage communicating between the oil supply chamber and the air outlet, said passage having an enlarged threaded portion in open communication with the oil supply chamber and having an orifice of reduced diameter opening from the enlarged threaded portion to the air outlet, with a lateral passage from the enlarged threaded portion into a low point of the oil supply chamber, a valve screw loosely threadedly mounted in the enlarged threaded portion of the passage for limited vertical play therein, said screw having an end portion of reduced diameter with a valve seat thereon adapted to close said orifice on a predetermined inward movement of said screw, said screw having a head portion thereof exposed to the oil in said oil supply chamber to move said screw from open to closed position in said orifice on a predetermined unbalance of pressure between the oil in said oil chamber and said outlet, such unbalance of pressure simultaneously acting to force a limited supply of oil through said orifice into said outlet, and a resilient washer mounted beneath the head of said screw normally to urge said screw outwardly toward the outermost limit of its play, the resilient force of said washer being less than the closing force exerted on said screw by said predetermined unbalance of pressure.

5. A device for installation in a compressed air line, comprising a body portion having an air inlet and an air outlet, an oil supply chamber, a passage communicating between the oil supply chamber and the air outlet, said passage having an enlarged threaded portion in open communication with the oil supply chamber and having an orifice of reduced diameter opening from the enlarged threaded portion to the air outlet, with a lateral passage from the enlarged threaded portion into a low point of the oil supply chamber, a valve screw loosely threadedly mounted in the enlarged threaded portion of the passage for axial play therein, said screw having an inner end portion of reduced diameter with a valve seat thereon adapted to close said orifice on a predetermined inward movement of said screw, said screw having a head portion thereof exposed to the oil in said oil supply chamber to move said screw from open to closed position in said orifice on a predetermined unbalance of pressure between the oil in said oil chamber and the pressure in said air outlet, such unbalance of pressure simultaneously acting to force a limited supply of oil through said lateral passage and said orifice into said outlet.

WYETH C. WALTERS.

REFERENCES CITED

The following references are of record in the file of this patent:

UNITED STATES PATENTS

| Number | Name | Date |
|---|---|---|
| 745,567 | Burrell | Dec. 1, 1903 |
| 1,127,896 | Keller | Feb. 9, 1915 |
| 1,990,524 | Bystricky | Feb. 12, 1935 |
| 2,003,132 | Bliss | May 28, 1935 |
| 2,046,313 | Arnold | July 7, 1936 |

FOREIGN PATENTS

| Number | Country | Date |
|---|---|---|
| 26,284 | Great Britain | 1909 |